United States Patent
Ko et al.

(10) Patent No.: US 8,930,343 B2
(45) Date of Patent: Jan. 6, 2015

(54) SYSTEM AND METHOD FOR COLLECTING DOCUMENT

(75) Inventors: Young Su Ko, Gwangju-si (KR); Seung Yeop Han, Seoul (KR); Jung Woo Seo, Seoul (KR)

(73) Assignee: NHN Corporation, Seongnam-si (KR)

( * ) Notice: Subject to any disclaimer, the term of this patent is extended or adjusted under 35 U.S.C. 154(b) by 376 days.

(21) Appl. No.: 13/165,338

(22) Filed: Jun. 21, 2011

(65) Prior Publication Data

US 2011/0320427 A1 Dec. 29, 2011

(30) Foreign Application Priority Data

Jun. 24, 2010 (KR) .......................... 10-2010-0060185

(51) Int. Cl.
*G06F 17/30* (2006.01)

(52) U.S. Cl.
CPC ............................... *G06F 17/30864* (2013.01)
USPC ..................... 707/709; 707/711; 707/E17.108

(58) Field of Classification Search
CPC ...................... G06F 17/30864; G06F 17/30613
USPC ............................. 707/709, 711, 710, E17.108
See application file for complete search history.

(56) References Cited

U.S. PATENT DOCUMENTS

| | | | | |
|---|---|---|---|---|
| 8,131,702 | B1 * | 3/2012 | Bharat et al. .................. | 707/706 |
| 8,255,411 | B1 * | 8/2012 | Carpenter et al. ............ | 707/764 |
| 2004/0088332 | A1 * | 5/2004 | Lee et al. ........................ | 707/200 |
| 2005/0165743 | A1 * | 7/2005 | Bharat et al. ...................... | 707/3 |
| 2008/0243831 | A1 * | 10/2008 | Kunitake ........................... | 707/5 |
| 2008/0319952 | A1 * | 12/2008 | Carpenter et al. ................. | 707/3 |
| 2009/0037533 | A1 | 2/2009 | Gilfix et al. | |
| 2010/0306228 | A1 * | 12/2010 | Carpenter et al. ........... | 707/765 |
| 2010/0318890 | A1 * | 12/2010 | Billharz et al. ............... | 715/212 |
| 2011/0173177 | A1 * | 7/2011 | Junqueira et al. ............. | 707/709 |
| 2011/0295844 | A1 * | 12/2011 | Sun et al. ...................... | 707/723 |
| 2013/0019153 | A1 * | 1/2013 | Billharz et al. ............... | 715/212 |

FOREIGN PATENT DOCUMENTS

| | | |
|---|---|---|
| CN | 101493828 | 7/2009 |
| JP | 2008-262520 | 10/2008 |

OTHER PUBLICATIONS

Extended European Search Report dated Nov. 21, 2012 for Application No. EP 11 17 1100.

* cited by examiner

*Primary Examiner* — Phong Nguyen
(74) *Attorney, Agent, or Firm* — Greer Burns & Crain Ltd.

(57) ABSTRACT

Provided is a system and method for collecting a document. The system may include an identification information receiver to receive, from a host of a site, identification information of a document of which an update may occur, a collection request transfer unit to transmit a collection request for the document based on the identification information, an update information collector to receive update information of the document from the host, and a search result provider to provide, to the host, a search result extracted from the update information of the document, in response to the search request being received from the host. The system for collecting the document may reduce load of a web site, and may improve accuracy of the document to be collected.

20 Claims, 5 Drawing Sheets

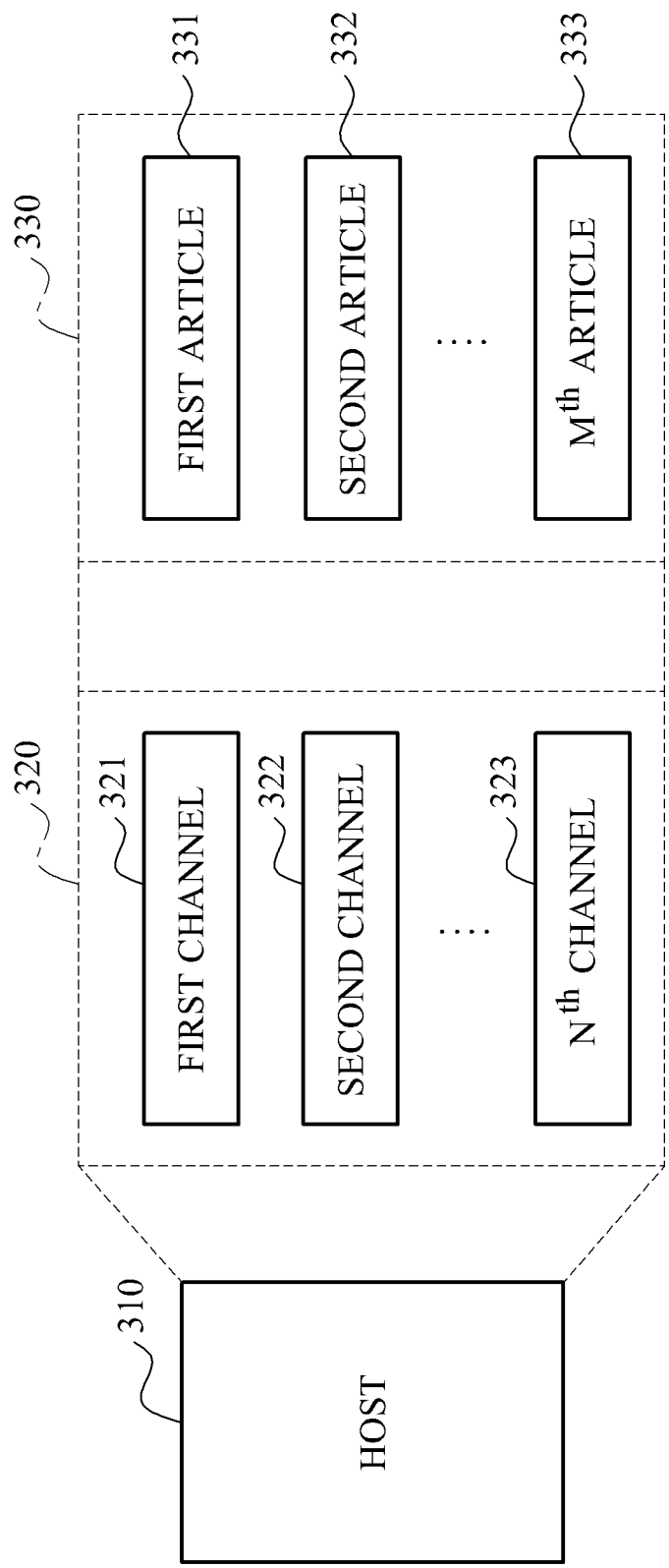

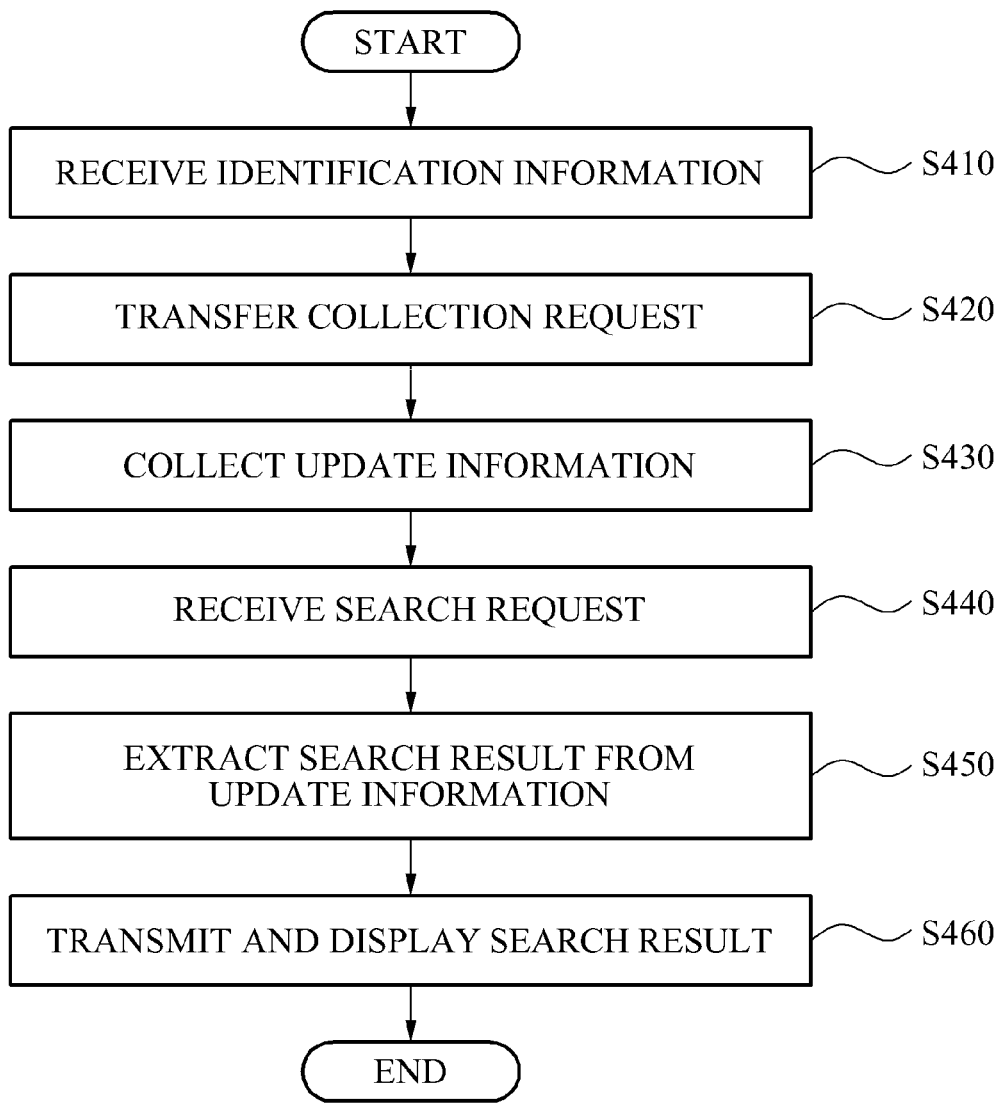

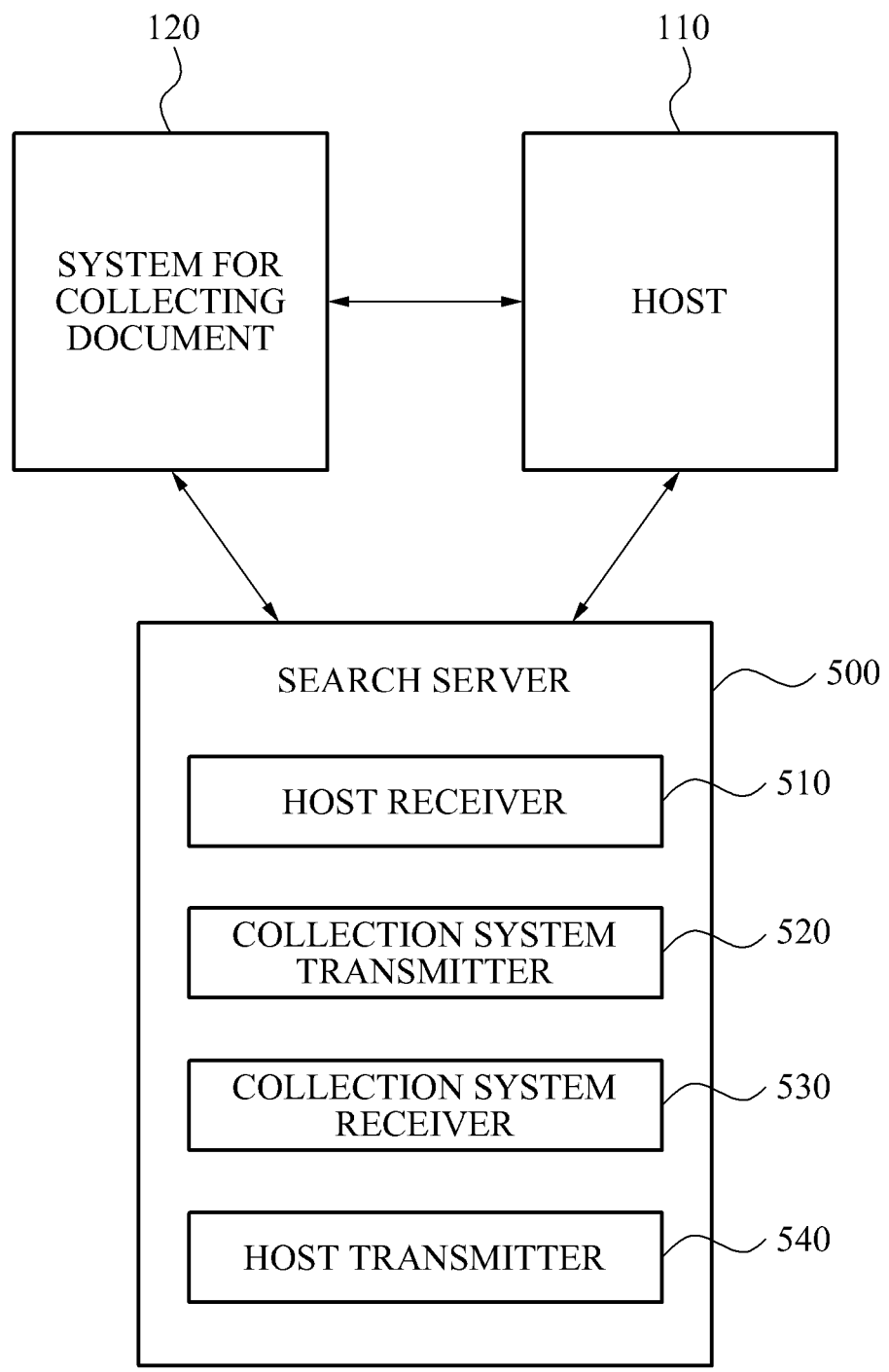

SYSTEM AND METHOD FOR COLLECTING DOCUMENT

CROSS REFERENCE TO RELATED APPLICATION

This application claims priority from and the benefit of Korean Patent Application No. 10-2010-0060185, filed on Jun. 24, 2010, which is hereby incorporated by reference for all purposes as if fully set forth herein.

BACKGROUND OF THE INVENTION

1. Field of the Invention

Exemplary embodiments of the present invention relate to a system and method for collecting a document from a host, and more particularly, to a system and method for collecting a document for which updates may occur.

2. Discussion of the Background

Generally, a search service business may collect contents of documents from a plurality of sites that exist on the Internet, using a web robot. The web robot may collect the contents included in the documents using a crawling technique of a random access scheme. The search service business may randomly extract a Seed uniform resource locator (URL), and may collect documents using the web robot based on the extracted Seed URL. In some cases, the collected documents may be unrelated to the URL of the collected documents.

When a document is collected by the above-described method, random access of the web robot may cause a problem in that information overload may occur at a host of a website. Also, due to random collection performed by the web robot, the search service business may provide, as part of a search result, documents unrelated to a search request. Accordingly, the search service business may experience difficulty in analyzing a result of collecting documents because of the unrelated URL and document contents.

In view of the foregoing, there is a need for a system and method for collecting an accurate web document without causing overload for a host of a website.

SUMMARY OF THE INVENTION

Exemplary embodiments of the present invention provide a system and method that may reduce a load of a site host caused by random crawling.

Additional features of the invention will be set forth in the description which follows, and in part will be apparent from the description, or may be learned by practice of the invention.

Exemplary embodiments of the present invention disclose a system including an identification information receiver, a collection request transfer unit, an update information collector, and a search result provider. The identification information receiver receives, from a host, identification information of a document. The collection request transfer unit transmits, to the host, a collection request for the document, based on the identification information. The update information collector receives, from the host, update information of the document. The search result provider provides, to the host, a search result extracted from the received update information of the document, in response to a search request received from the host.

Exemplary embodiments of the present invention also disclose a method of collecting a document. The method includes receiving, from a host, identification information of a document, and transmitting, to the host, a collection request for the document, based on the identification information. The method further includes receiving update information of the document from the host, and providing, to the host, a search result extracted from the update information of the document, in response to a search request received from the host.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

FIG. 3 is a diagram illustrating a configuration of a resource according to exemplary embodiments of the present invention.

FIG. 4 is a flowchart illustrating a method of collecting a document according to exemplary embodiments of the present invention.

FIG. 5 is an example of a system for searching for a collected document according to exemplary embodiments of the present invention.

DETAILED DESCRIPTION OF THE ILLUSTRATED EMBODIMENTS

Figure 1:
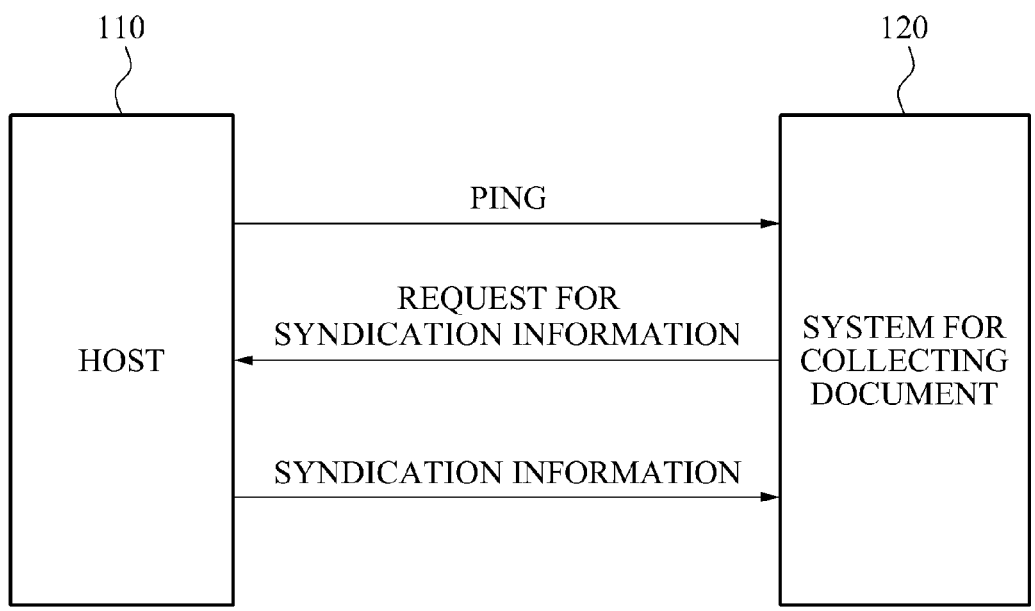
FIG. 1 is a diagram illustrating a process of collecting a document according to exemplary embodiments of the present invention.

The invention is described more fully hereinafter with reference to the accompanying drawings, in which exemplary embodiments of the invention are shown. This invention may, however, be embodied in many different forms and should not be construed as being limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present.

The terminology used herein is for the purpose of describing exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, exemplary embodiments of the present invention will be described in detail with reference to the accompanying drawings.

FIG. 1 is a diagram to describe a process of collecting a document according to exemplary embodiments of the present invention.

Referring to FIG. 1, when update of a document uploaded to a web site occurs, a host 110 for the site may transmit, to a system 120 that collects documents, identification information such as a ping protocol that may include an identification of the document. The update of the document may indicate a registration, revision, deletion, and/or any other edits of contents in the document. A ping may correspond to a type of signal indicating that an update of the document has occurred. The site may be any web page or web site that is accessible by the internet. A document may be any type of file (e.g., graphic, video, audio, flash, or word processing file), and may be uploaded to the site, or, in general, to any web site. The host 110 for the site may include, for example, a server or an internet cloud that can connect to the internet, host the site, and that can process any process related to the site. It should be appreciated that the host 110 may include various hardware and/or software components that can process, store, and manage various data, and transmit and receive various data across the internet or any other suitable wireless or wired network. It should also be appreciated that the system for collecting document 120 may include various hardware and/or software components that can process, store, and manage various data, and transmit and receive various data across the internet or any other suitable wireless or wired network.

In response to receiving the identification information, the system 120 may request the host 110 for the document of which an update has occurred. For example, the system 120 may request syndication information including the document of which an update has occurred that may satisfy an Atom Syndication Format.

The host 110 may transfer, to the system 120, the document of which an update has occurred, in response to receiving the request for the syndication information from the system 120. Particularly, the system 120 may receive, from the host 110, syndication information configured in an extensible markup language (XML) format.

The host 110 may prevent an undesired document from being collected in the system 120 by transmitting, to the system 120, identification information associated with a document desired to be searched. For example, when an update of registration, revision, deletion, and/or any other edits of contents occurs in the document desired to be searched, the host 110 may transmit, to the system 120, the identification information such as the ping, thereby reducing overload caused by random crawling.

Figure 2:
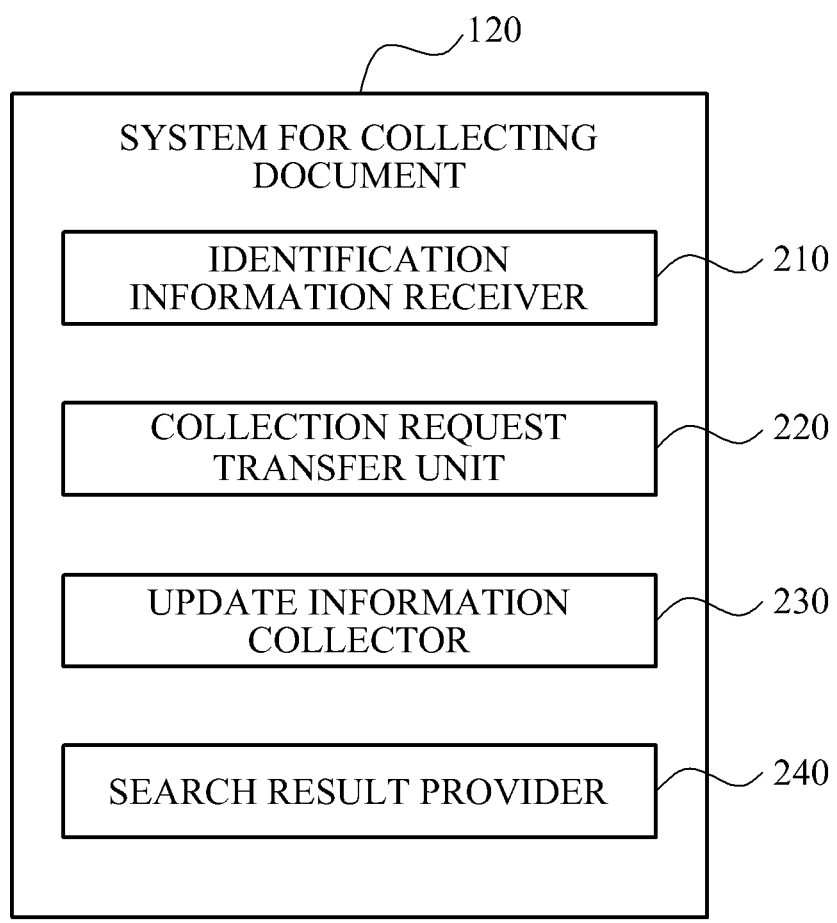
FIG. 2 is a block diagram illustrating a configuration of a system for collecting a document according to exemplary embodiments of the present invention.

FIG. 2 is a block diagram illustrating a configuration of the system 120 for collecting the document according to exemplary embodiments of the present invention.

Referring to FIG. 2, the system 120 for collecting the document may include an identification information receiver 210, a collection request transfer unit 220, an update information collector 230, and a search result provider 240.

The identification information receiver 210 may receive, from the host 110, identification information of a document of which an update may occur. The identification information may include a ping protocol associated with the document, such as registration, revision, deletion, and/or any other edits of contents that may occur.

The identification information receiver 210 may receive the identification information including link information associated with the document. The link information may include a uniform resource locator (URL) that indicates a location of the document. For example, the host 110 may transfer, to the system 120, the document using the identification information including the link information.

The collection request transfer unit 220 may transfer, to the host 110, a collection request for the document based on the identification information. Particularly, the collection request transfer unit 220 may transfer, to the host 110, the collection request for the document using a path designated in the link information included in the identification information. For example, the collection request transfer unit 220 may request to receive, from the host 110, a syndication document configured in an XML format, using the link information.

The link information included in the ping protocol corresponding to the identification information may be configured as follows:

http://[DOMAIN]/atom.cgi?id=[RESOURCE_ID]&type=[RESOURCE_TYPE]&&start-time=[START_TIME]&end-time=[END_TIME]&max-entry=[MAX_ENTRY]&page=[PAGE]

For example, parameters included in the link information may be defined as shown in TABLE 1.

TABLE 1

| Parameter | Value | Essential/Optional | Description |
| --- | --- | --- | --- |
| ID | Tag URI of resource | Optional (if omitted, the most significant resource ID) | Resource ID |
| Type | "Site", "channel", "article", "deleted" | Essential | Type of resource included in a syndication document. To indicate various types of resources by connecting the resources using a comma (,). "deleted" may be used when obtaining a deleted entry only. |
| Start-time | Time stamp e.g.) 2003-12-13T8:30:02% | Optional | Start time. A symbol '+' of the time stamp may be encoded as "% 2b". |
| End-time | Time stamp e.g.) 2003-12-13T8:30:02% | Optional | End time. A symbol '+' of the time stamp may be encoded as "% 2b". |
| Max-entry | Integer in range of 1 through 10000 | Optional | A maximum number of entries included in a feed document |
| Page | Integer in range of 1 through 10000 | Optional (if omitted, default of 1) | Page number |

In TABLE 1, "ID Parameter" may be expressed based on a Tag Uniform Resource Identifier (URI) suggested by an Atom Syndication Format. When a hyphen '-' is included in a channelID in the Tag URI, the Tag URI may be expressed based on URL encoding.

The Tag URI may include a resource. For example, the resource may include "site", "channel", and "article". An example of expressing an actual resource link using the Tag URI, for each type of resource may be represented in TABLE 2.

TABLE 2

| Type of resource | Resource link | Tag URI |
|---|---|---|
| Site | http://www.xpressngine.com | tag:www.xpressngine.com,2008:site |
| Channel | http://www.xpressngine.com/notice | tag:www.xpressngine.com,2008:channel:notice |
| Article | http://www.xpressngine.com/notice/169 | tag:www.xpressngine.com,2008:article:notice-169 |

The range of the resource included in the syndication document of the XML format, that may be requested by the collection request transfer unit 202 may be determined based on values of "ID parameter" and "type parameter". For example, the range of the resources may be determined as represented in TABLE 3.

TABLE 3

| ID | Type | Description |
|---|---|---|
| Site | Site | Site information |
|  | Channel | All of channel information of site |
|  | Article | All of article contents of site |
| Channel | Channel | Own channel information |
|  | Article | All of article contents included in a channel |
| Article | Article | Own article contents |

When "ID" included in the identification information, received by the identification information receiver 210, corresponds to "site" and "type" included in the identification information, corresponds to "channel," the collection request transfer unit 220 may transmit, to the host 110, a collection request for a syndication document for requesting information of all channels supported by the site managed by host 110. In response, the host 110 may transmit, to the system 120 for collecting the document, update information of all of the channels supported by the site managed by host 110, according to the collection request.

The update information collector 230 may collect the update information of the document received from the host 110, in response to the collection request for the document.

The update information of the document may correspond to an XML document format including at least one element. Particularly, the update information collector 230 may collect the update information of the document by receiving, from the host 110, the syndication document configured in the XML format.

Also, the update information of the document may include elements as represented in TABLE 4.

TABLE 4

| Element | Property | Description |
|---|---|---|
| atom:feed |  | Container element containing atom:entry element |
| atom:entry |  | Element representing resource |
| atom:id |  | The only ID to classify resource. Use Tag URI suggested in Atom Syndication Format. |
| atom:title |  | Title of resource |
| atom:updated |  | Recently revised time. Use time stamp format, and Tag URI suggested in Atom Syndication Format. |
| atom:link |  | Element representing a relation between resources, which may represent various types of relations using "rel" property. |
|  | rel | To indicate relation of link |
|  | href | To provide address of related resource |
|  | ref | To indicate ID of related resource |

TABLE 4-continued

| Element | Property | Description |
|---|---|---|
| atom:author |  | Author of resource. To represent the author using sub-elements, such as atom:name, atom:rel, and atom:email. |
| atom:category |  | Category of resource, or tag information |
| atom:content |  | Contents of resource |
| syndi:delete |  | Time when resource is deleted. Extension element defined for reporting deletion of resource. Use time stamp format. e.g., 2003-12-13T18:30:02+01:00, 2003-12-13T18:30:02Z |
| syndi:type |  | Type of resource. Extension element defined for indicating type of resource.Only used in channel, and indicated as "blog" for a blog, and "web" for the others which may be omitted. |

A value of "rel property" of a link element may be designated as represented in TABLE 5. The resource associated with the syndication document may be different based on the value designated in TABLE 5.

TABLE 5

| rel property value | Description | Available resource |
|---|---|---|
| Self | Link that obtains syndication document of resource | Site, channel, article |
| Alternative | Link that directly accesses resource | Site, channel, article |
| Site | Site link that owns resource | Channel, article |
| Parent-channel | Upper channel link of corresponding channel | Channel |
| Child-channel | Lower channel link of corresponding channel | Channel |
| Channel | Channel link including resource | Article |
| RSS | RSS information of channel (Essential for blog) | Channel |

A minimum unit of the syndication document of the XML document, received by the update information collector 230, may correspond to an entry document including a single entry element.

When there is a plurality of elements, the update information collector 230 may perform collection by grouping the plurality of the elements into element groups. When a single syndication document includes a plurality of entry elements, the update information collector 230 may perform the collection by grouping the plurality of the entry elements into feed elements. The update information of the document, grouped into the feed elements, may correspond to a feed document format.

For example, when the single syndication document includes the plurality of the entry elements, elements represented in TABLE 6 may be additionally included in the feed elements, in addition to the entry elements.

TABLE 6

| Element | Description |
| --- | --- |
| atom:id | The only ID to classify feed document. Use Tag URI Format. |
| atom:title | Brief description of feed document |
| atom:updated | Time when feed document is updated |

The update information collector 230 may collect the update information of the document based on a distribution period included in the identification information. When "start-time" and "end-time" of TABLE 1 are included in the identification information, the update information collector 230 may collect update information of a document corresponding to the identification information, from the "start-time" to the "end-time".

The aforementioned configuration described a process of collecting the update information of the document from host 110. The system 120 may use the update information of the document, collected from the host 110, for performing a search.

When a search request is received from the host 110 (e.g., a search may be requested via the site), the search result provider 240 may return the search result corresponding to the search request to the host 110. The search request may include a keyword, and an option according to the keyword. System 120 may be connected to the internet or additional networks and the search result provider 240 may obtain search results by accessing the internet or the additional networks.

The search result provider 240 may extract the search result corresponding to the search request, from the update information of the document that the update information collector 230 may collect, and may provide the extracted search result to the host 110. The host 110 may display the search result, received from the system 120, by rendering the search result on a host interface. For example, search results may be displayed via a graphical interface of host 110. Accordingly, system 120 can perform a role of a separate search database for the host 110.

FIG. 3 is a diagram illustrating a configuration of a resource that may be used according to exemplary embodiments of the present invention.

As illustrated in FIG. 3, the resource may have a hierarchical configuration including a site 310, a channel 320, and an article 330.

The site 310 may provide a plurality of channels 320, for example, a first channel 321, a second channel 322, through an $N^{th}$ channel 323. Each of the channels may include a plurality of articles 330, for example, a first article 331, a second article 332, through an $M^{th}$ article 333. N and M may be any whole number greater than 1. An article may correspond to a document.

When "ID" of the identification information corresponds to "site", and "type" of the identification information corresponds to "article", the host 110, which processes any process related to the site 310, may transmit, to the system 120 update information of all the plurality of the articles 330 provided by the site 310, as represented in TABLE 3. The host 110 may determine a range of collection of the document using the parameters in TABLE 3.

FIG. 4 is a flowchart illustrating a method of collecting a document according to exemplary embodiments of the present invention.

In S410, the identification information receiver 210 may receive, from the host 110, identification information of a document for which an update may occur. The identification information may include link information associated with the document.

In S420, the collection request transfer unit 220 may transfer, to the host 110, a collection request for the document, based on the identification information received in operation S410. For example, the collection request transfer unit 220 may transfer, to the host 110, the collection request for the document using a path designated in the link information included in the identification information.

In S430, the update information collector 230 may receive update information of the document from the host 110 in response to the collection request for the document being transmitted in S420. The update information of the document that the update information collector 230 may collect from the site 110 may correspond to a document in an XML format including at least one element.

In S410 through S430, as described hereinabove, the system 120 may collect update contents of the document from the host 110. In S440 through S460, the system 120 may provide a search result based on the update contents of the document.

In particular, in S440, the search result provider 240 may receive a search request from the host 110.

In S450, the search result provider 240 may extract a search result from the update information of the document collected in S430, using the search request received in S440.

In S460, the search result provider 240 may transmit, to the host 110, the search result extracted in S450. The host 110 may display the received search result by rendering the received search result based on a host interface.

FIG. 5 is an example of the system 120 for searching for a collected document according to exemplary embodiments of the present invention.

The system 120 may separately include a search server 500 that may search for update information of the collected document as illustrated in FIG. 5.

The system 120 may collect the document from the host 110 using the identification information receiver 210, the collection request transfer unit 220, and the update information collector 230, and may provide a search result to the search server 500 by searching for the collected document according to the request of the search server 500.

When a search request is received from the host 110, the search server 500 may transmit the search request to the system 120, and may provide the search result to the host 110, by receiving, from the system 120, the search result corresponding to the search request.

The search server 500 may include a host receiver 510, a collection system transmitter 520, a collection system receiver 530, and a host transmitter 540. It should be appreciated that the search server 500 may include various hardware and/or software components that can process, store, and manage various data, and transmit and receive various data across the internet or any other suitable wireless or wired network.

The host receiver 510 may receive the search request from the host 110, and the collection system transmitter 520 may transmit, to the system 120, the search request received from the host 110.

The collection system receiver 530 may receive the search result corresponding to the search request transmitted from the system 120, and the host transmitter 540 may provide the received search result to the host 110.

According to exemplary embodiments of the present invention, it is possible to prevent an undesired document from being collected in a system for collecting documents by collecting only a document corresponding to the update information of the document and associated identification information.

Various aspects of the invention may be implemented on one or more computer systems, such as the host 110, system 120, and server 500. Such computer systems may includes input device(s), output device(s), processor(s), memory system(s), and storage unit(s), all or some of which are coupled, directly or indirectly, via an interconnection mechanism, which may be comprised of one or more buses, switches, and/or networks. The input device(s) may receive input from a user or machine (e.g., a human operator, or telephone receiver), and the output device(s) may display or transmit information to a user or machine (e.g., a liquid crystal display). The processor(s) may execute a computer program (e.g., an operating system) which controls the execution of other computer programs, and provides scheduling, input/output and other device control, accounting, compilation, storage assignment, data management, memory management, communication, and data flow control The above-described embodiments of the present invention can be implemented in any of numerous ways. For example, the exemplary embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed function. The one or more controller can be implemented in numerous ways, such as with dedicated hardware, or with general purpose hardware (e.g., one or more processor) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code.

It should be appreciated that exemplary embodiments of the invention are also directed to a computer readable medium encoded with one or more programs including instructions that, when executed on one or more computers or other processors, perform methods that implement the various embodiments of the invention discussed above. The computer-readable media may include, but are not limited to, transitory and non-transitory media, and volatile and non-volatile memory. The computer-readable media may include storage media, such as, for example, read-only memory (ROM), random access memory (RAM), floppy disk, hard disk, optical reading media (e.g., compact disc-read-only memory (CD-ROM), digital versatile discs (DVDs), hybrid magnetic optical disks, organic disks, flash memory drives or any other volatile or non-volatile memory, and other semiconductor media. In some cases, the computer-readable media may be electronic media, electromagnetic media, infrared, or other communication media such as carrier waves. Communication media generally embodies computer-readable instructions, data structures, program modules or other data in a modulated signal such as the carrier waves or other transportable mechanism including any information delivery media. Computer-readable media such as communication media may include wireless media such as radio frequency, infrared microwaves, and wired media such as a wired network. Also, the computer-readable storage media can store and execute computer-readable codes that are distributed in computers connected via a network. The computer-readable media also includes cooperating or interconnected computer-readable media that are in the processing system or are distributed among multiple processing systems that maybe local or remote to the processing system. The computer readable medium or media can be transportable, such that the program or programs stored thereon can be loaded onto one or more different computers or other processors to implement various aspects of the present invention as discussed above.

Although a few exemplary embodiments of the present invention have been shown and described, the present invention is not limited to the described exemplary embodiments. It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A system for collecting documents from at least one network website on a computer network operated by a host computer, comprising:
    a memory for storing a plurality of functional program units;
    at least one processor for executing the plurality of functional program units in the memory;
    the functional program units including,
    an identification information receiver unit to receive from the host computer operating the at least one network website, identification information of a document uploaded on the network site website, when the document is updated;
    a collection request transfer unit to transmit to the host computer, a collection request for the updated document, based on and responsive to the receipt of the identification information from the host computer;
    an update information collector unit to receive, from the host computer, update information of the updated document; and
    a search result provider unit to provide, to the host computer, a search result extracted from the received update information of the updated document, in response to a search request received by the search result provided unit from the host computer;
    wherein the collection request transfer unit collects from the host computer only documents having identification information that have been received by the identification information receiver from the host computer, and
    wherein the update information collector unit performs the receiving by grouping a plurality of elements into element groups in response to the received update information of the updated document comprising the plurality of elements.

2. The system of claim 1, wherein the identification information comprises link information associated with the updated document.

3. The system of claim 1, wherein the received update information of the updated document comprises an extensible markup language (XML) document comprising at least one element.

4. The system of claim 3, wherein the update information collector unit receives the update information of the updated document based on a distribution period provided by the identification information.

5. The system of claim 1, wherein the host computer displays the search result by rendering the search result based on a host interface.

6. The system of claim 1 further comprising:
a search server including,
a collection system transmitter to transmit the search request, received from the host computer to the search result provider unit;
a collection system receiver to receive, from the search result provider unit, the search result corresponding to the search request; and
a host transmitter to provide the search result to the host computer.

7. The system of claim 6, wherein the host computer displays the search result by rendering the search result based on a host interface.

8. The system of claim 6, wherein the update information collector unit collects the update information of the updated document from the host computer, in a form of an extensible markup language (XML) document comprising at least one element.

9. The system of claim 6, wherein the update information collector unit collects the update information of the updated document based on a distribution period.

10. A method of collecting documents from at least one network website on a computer network operated by a host computer, using a document collecting apparatus in communication with the computer network, the method comprising:
receiving, from the host computer operating a corresponding network site the at least one network website, identification information of a document uploaded on the network website, when the document is updated;
transmitting, to the host computer, a collection request for the updated document, based on and responsive to the receipt of the identification information from the host computer;
receiving update information of the updated document from the host computer; and
providing, to the host computer, a search result extracted from the update information of the updated document, in response to a search request received from the host computer;
wherein the document collection apparatus collects only documents having identification information that have been received from the host computer, and
wherein the receiving of the update information comprises collecting the received update information by grouping a plurality of elements into element groups in response to the received update information of the updated document comprising the plurality of elements.

11. The method of claim 10, wherein the identification information comprises link information associated with the updated document.

12. The method of claim 10, wherein the received update information of the updated document comprises an extensible markup language (XML) document comprising at least one element.

13. The method of claim 12, wherein the receiving of the update information comprises receiving the update information of the updated document based on a distribution period provided by the identification information.

14. The method of claim 10, further comprising:
displaying, by the host computer, the search result by rendering the search result based on a host interface.

15. The method of claim 10 further comprising:
using a search server in
transmitting the search request, received from the host computer through the computer network, to the document collecting apparatus;
receiving, from the document collecting apparatus, the search result corresponding to the search request; and
providing the search result to the host computer through the computer network.

16. The method of claim 15, wherein the host displays the search result by rendering the search result based on a host interface.

17. The method of claim 15, wherein the document collecting system receives the update information of the updated document from the host computer, in a form of an extensible markup language (XML) document comprising at least one element.

18. The method of claim 15, wherein the document collecting system collects the update information of the updated document based on a distribution period.

19. A non-transitory computer-readable medium comprising a program for instructing a computer to perform the method of claim 10.

20. The non-transitory computer-readable medium of claim 19, wherein the program further includes instructions comprising:
using a search server in
transmitting the search request, received from the host computer through the computer network, to the document collecting apparatus;
receiving, from the document collecting apparatus, the search result corresponding to the search request; and
providing the search result to the host computer through the computer network.

* * * * *